July 7, 1931. S. J. V. BOVEY 1,813,273
VALVE CONSTRUCTION AND METHOD FOR MAKING THE SAME
Filed June 27, 1927
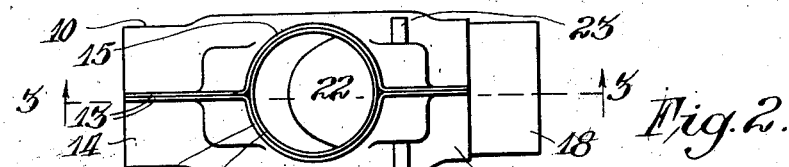
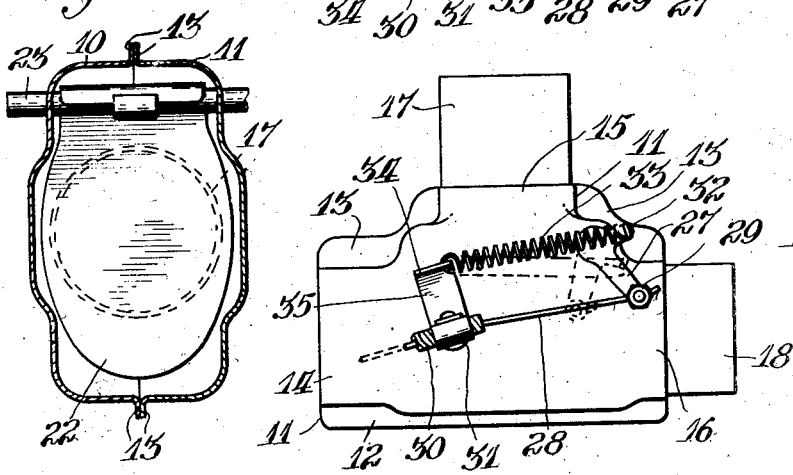
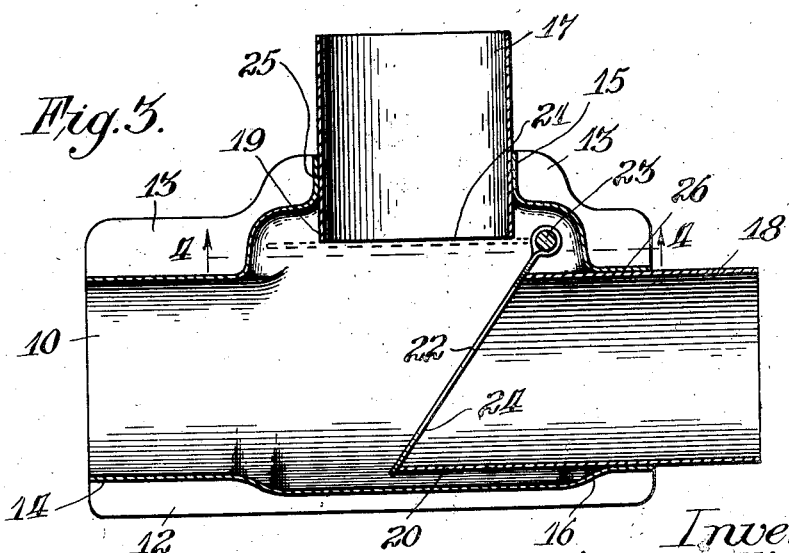
Inventor.
Sidney J. V. Bovey,
By John P. Smith
Atty.

Patented July 7, 1931

1,813,273

UNITED STATES PATENT OFFICE

SIDNEY J. V. BOVEY, OF CHICAGO, ILLINOIS, ASSIGNOR, BY MESNE ASSIGNMENTS, TO METALCRAFT HEATER CORPORATION, OF GRAND RAPIDS, MICHIGAN, A CORPORATION OF MICHIGAN

VALVE CONSTRUCTION AND METHOD FOR MAKING THE SAME

Application filed June 27, 1927. Serial No. 201,675.

This invention relates to a valve construction and method of making the same.

One of the objects of the present invention is to provide an economical construction of a valve which is preferably made of sheet metal stampings and so constructed as to form a substantially air tight valve in which the flap thereof may be properly seated on its seat in the two positions of its adjustment.

Another object of the invention is to provide a simple and economical valve construction which may be used for many purposes but which is particularly adapted for use in connection with the vehicle heaters and the like for controlling the flow of either heated air or exhaust gases.

A still further object of the invention is to provide a novel and economical construction of a valve by means of which the valve seats of the valve may be adjusted with respect to the casing so that the flap may be properly seated on the valve seat so as to form substantially air tight construction.

A still further object of the invention is to provide a novel and economical method of making a valve so as to produce a substantially air tight construction.

Another object of my invention is to provide a novel valve construction in which the valve seats are in knife-like form or relatively thin and spaced from the walls of the valve casing so that the possibility of any foreign material such as carbon particles and the like being deposited on the seats, is entirely eliminated.

A still further object of the invention is to provide a process for making my improved valve, by means of which the valve seats may be properly adjusted with respect to the flap so that an air tight valve is provided prior to the seats being secured to the valve casing.

These and other objects are accomplished by providing construction and arrangement of the various parts in the manner hereinafter described and particularly pointed out in the appended claims.

Referring to the drawings:

Figure 1 is a side-elevational view showing my improved valve construction.

Figure 2 is a top plan view of the same.

Figure 3 is an enlarged cross-sectional view taken on the lines 3—3 in Figure 2, and Figure 4 is a cross-sectional view taken on the lines 4—4 in Figure 3.

Heretofore it was expensive to manufacture valves when the casings thereof were castings and had to be finished or machined so that the flap constituting the valve could be seated properly. Usually the valve seats were large and permitted foreign matter to collect thereon, with the result that the valves were unable to seat properly upon such seats.

With the present invention I have provided a valve construction in which the valve casing proper is made of two sections which are symmetrical in form and are indicated by the reference characters 10 and 11. These casing members 10 and 11 are provided with complementary semi-circular portions 14, 15 and 16 respectively, so as to form circular sockets therein. The sockets formed by the semi-circular portion 15 and 16 of each of the casing members 10 and 11 are adapted to receive therein tubular members 17 and 18 respectively. The tubular members are preferably ordinary tubing or formed of sheet metal and extend inwardly of the casing members so that the inner edges thereof are spaced from the sidewall of the casing members as clearly shown at 19 and 20. The inner edge of the tubular member 17 as shown at 21 is cut off transversely or at right angle with respect to the longitudinal axis thereof, so as to form a perfect seat for a flap 22 which is pivoted on a pin or shaft 23, journaled in oppositely disposed bores in the casing members. The tubular member 18 is preferably cut off at an angle of substantially sixty degrees from the horizontal as viewed from Fig. 3 and indicated by the reference character 24 so that the flap 22 will properly seat itself on the valve seat formed by the inner end of the tubular member 18.

In the assembly of the construction thus far described it will, of course, be understood that the flap 22 which is secured to the shaft 23 in any well known manner, is mounted in the registered apertures formed in the casing members 10 and 11, after which the flanges 13 and 12 of the casing members 10 and 11 are welded together. When this portion of the operation is completed, the tubular member 17 is then inserted in the circular socket 15 formed by the casing member 10 and 11 and adjusted to the position in which the flap 22 is properly seated on the seat 21 on inner edge of the tubular member 17 and when thus adjusted to its proper position, is welded to the flange or semi-circular socket 15 as shown at 25. In a similar manner the tube 18 inserted in the circular socket formed by the semi-circular portion 16 of each of the casing members 10 and 11 respectively, so that its beveled edge or seat 24 is properly adjusted to a position in which the flap 22 completely engages or closes the inner end of the tube 18 after which the tube 18 is then welded to the flange forming the circular socket 16 as shown at 26. With this method of assembly, it will readily be seen that I have provided a very simple and economical arrangement of a valve construction in which both of these tubular members may be properly adjusted prior to being secured into the valve casing in such a manner that a proper seating of the flap on the two seats of the valve is easily and properly secured without the necessity of any further finishing of the valve seats as is required in the ordinary valve construction. It will also be seen that by using the metal tubes as shown at 17 and 18 and having the edges thereof form the seats for the flap of the valve so that a substantially knife-like seat is presented to the valve flap the possibility of foreign material being deposited on the seat is entirely eliminated. It will also be noted that by having the tubular members 17 and 18 extend into the valve casing so that the seats thereof are spaced from the walls of the casing, the possibility of any interference from the deposits of any foreign material on the seat are entirely eliminated. It will be further noted that I have shown and described the members 17 and 18 as being circular or tubular in form. The term "tubular", throughout the specification and claims, contemplates the use of any form of a hollow conduit, such as an oval, irregular or hollow square conduit, which, obviously, could be seated in complementary sockets formed in the casing to accommodate the various forms and thereby accomplish the same result.

In the form of the invention illustrated in the drawings I have shown the shaft or pin 23 provided with a bell crank lever 27 which is secured to one end of the shaft 23 having one of its arms connected by means of a wire 28 and attaching screw 29. The wire 28 extends through a guide 30 (only part of which is shown) which is secured by means of a clip 31 to the casing member 11. The other end of the wire 28 extends to a point adjacent the instrument board of a vehicle from where the valve flap may be controlled within easy reach of the operator. Any form of control now in common use, of course, may be used. The bell crank 27, is provided with a short right-angularly bent arm 32 which has connected thereto one end of a spring 33. The other end of the spring 33 is connected to the right-angularly bent portion 34 of a clip 35 which is secured to the valve casing 11, in any well known manner. This spring 33 is so arranged with respect to the shaft 23 so as to pass on the opposite sides of the center for locking the flap either in the full line position or dotted line position shown in Figure 2.

From the above description it will be readily seen that I have provided a very simple and economical construction of a valve which is preferably made of sheet metal and one in which the cost of the manufacture is considerably reduced because the labor required in assembling the valve is reduced to a minimum. It will also be noted that the casing members might be cast metal with the circular socket reamed after which the tubular members 17 and 18 may be inserted and secured.

What I claim as my invention and desire to secure by Letters Patent is:

1. The herein described method of making a valve from sheet metal consisting of first stamping two valve casing members having corresponding semi-circular flanges and complementary laterally extending flanges thereon, then pivotally mounting a flap between said casing members at a point along said laterally extending flanges, then inserting tubular members in said semi-circular flanges and adjusting them so that the flap properly seats on the inner edges thereof, then welding the semi-circular flanges to said tubular members.

2. The method of making a valve including the steps of forming complementary valve casing sections, pivotally mounting a valve element between said sections, adjusting tubular seats for said valve element between the sections into engagement with the valve to determine the proper location of said seats, and securing the tubular seats in such adjusted position.

3. The method of making a valve including the steps of forming complementary valve casing sections having portions in planes at substantially right angles to each other forming tubes, pivotally mounting a valve between the sections so that it may swing toward and from said tubular portions, securing the sections together, adjusting tubular seats for the valve in the tubes aforesaid into engagement with the valve to determine the proper location of said seats, and securing the tubular seats in such adjusted position.

4. The method of making a valve including the steps of forming complementary valve casing sections having portions forming tubes, mounting a valve adjacent the tubes, securing the sections together, adjusting tubular seats for the valve longitudinally of the tubes for proper seating engagement with the valve, and securing the tubular seats to the sections to maintain them in such adjusted position.

In testimony whereof he has signed his name to this specification on this 23rd day of June A. D. 1927.

SIDNEY J. V. BOVEY.